US007042182B2

United States Patent
Hahn et al.

(10) Patent No.: US 7,042,182 B2
(45) Date of Patent: May 9, 2006

(54) ELECTRONICALLY COMMUTATED MOTOR OPERABLE DIRECTLY FROM AC POWER NETWORK

(75) Inventors: Alexander Hahn, Saludorf-Boll (DE); Hermann Rappenecker, Vöhrenbach (DE); Harald Schmid, Emmingen (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 61 days.

(21) Appl. No.: 10/722,835

(22) Filed: Nov. 26, 2003

(65) Prior Publication Data

US 2004/0189230 A1 Sep. 30, 2004

(30) Foreign Application Priority Data

Dec. 2, 2002 (DE) .................... 102 56 198
Feb. 25, 2003 (DE) .................... 103 07 874

(51) Int. Cl.
*H01R 39/46* (2006.01)
*H02K 13/00* (2006.01)
*H02P 25/12* (2006.01)

(52) U.S. Cl. ............ 318/439; 318/254; 318/138
(58) Field of Classification Search ........ 318/254, 318/439, 138
See application file for complete search history.

(56) References Cited

U.S. PATENT DOCUMENTS 3,740,581 A * 6/1973 Pfiffner .................... 327/377

(Continued)

FOREIGN PATENT DOCUMENTS

DE 696 07 880 T2 9/1996
WO WO 200250897 A2 * 6/2002

OTHER PUBLICATIONS

Sujit K. Biswas, Gate Drive Methods for IGBT's in Bridge Configurations, pp. 1310-1316©1994 IEEE document 0-7803-1993-Jan. 1994.

(Continued)

*Primary Examiner*—David Martin
*Assistant Examiner*—Renata McCloud
(74) *Attorney, Agent, or Firm*—Milton Oliver, Esq.; Ware Fressola Van Der Sluys & Adolphson LLP (57) ABSTRACT

An electronically commutated motor (10) is adapted to be powered directly by an AC voltage ($U_{AC}$) source, and comprises a permanent-magnet rotor (18), a stator having at least one winding phase (L1, L2, . . . , Ln), a rectifier (38) which generates, from the AC voltage ($U_{AC}$), a pulsating DC voltage ($U_B$) between a positive lead (30) and a negative lead (32) of a DC link (15). Also present is a bridge circuit (28A, 28B, 28C), connected to that DC link (15) and provided to supply current to the at least one winding phase (L1, L2, . . . , Ln), which comprises a switching element (50) controllable with a control voltage ($U_{ST}$) that is lower than the pulsating DC voltage ($U_B$) to be switched. An auxiliary circuit (34, 34') generates, from the pulsating DC voltage ($U_B$) at the DC link and from the AC voltage ($U_{AC}$), a control voltage ($U_{ST}$) for driving the switching element (50) that is lower than the pulsating DC voltage by an amount equal to a predetermined value ($U_A$). A preferred filter (140) for connection to an AC power grid is described. A preferred embodiment of the circuit includes a bridge circuit having a p-channel MOSFET (50) at the positive lead (30) and an n-channel MOSFET (52) at the negative lead (32) of the DC link (15).

13 Claims, 8 Drawing Sheets

U.S. PATENT DOCUMENTS

| | | | | |
|---|---|---|---|---|
| 5,003,246 A * | 3/1991 | Nadd | ........................... | 323/349 |
| 5,610,486 A | 3/1997 | Li | ............................... | 318/439 |
| 5,771,166 A * | 6/1998 | Lim | ........................... | 363/132 |
| 5,963,024 A | 10/1999 | Doemen | ..................... | 323/282 |
| 6,008,602 A * | 12/1999 | Karwath | ..................... | 318/254 |
| 6,169,378 B1 * | 1/2001 | Karwath | ..................... | 318/254 |
| 6,452,349 B1 * | 9/2002 | Hahn et al. | ................. | 318/254 |
| 6,825,632 B1 * | 11/2004 | Hahn et al. | ................. | 318/599 |
| 2003/0080696 A1 * | 5/2003 | Tang et al. | ................. | 315/291 |
| 2004/0004404 A1 * | 1/2004 | Eckardt et al. | ............. | 307/140 |
| 2005/0041443 A1 * | 2/2005 | Franke et al. | ................. | 363/55 |

OTHER PUBLICATIONS

Lelkes et al., Single-phase External Rotor Synchronous Motor, 9$^{th}$ European Conf. On Power Electronics and Applications, (Aug. 2001).

Fairchild Semiconductor, datasheet on FQD3P50, 500V, P-Channel QFET, copyright 2003.

Zetex Semiconductors, NPN High Voltage Transistors, 300 to 500 volts, FMMT 459, copyright 2003.

* cited by examiner

ELECTRONICALLY COMMUTATED MOTOR OPERABLE DIRECTLY FROM AC POWER NETWORK

CROSS-REFERENCE TO RELATED PATENT

U.S. Pat. No. 5,963,024, DOEMEN, issued 5 Oct. 1999, SWITCHED MODE POWER SUPPLY and corresponding EP-0 854 562-B1.

FIELD OF THE INVENTION

The present invention relates generally to an electronically commutated motor that is adapted to be supplied directly from an AC or DC power network and comprises a permanent-magnet rotor as well as a stator having at least one winding phase. More particularly, the invention relates to a space-conserving control circuit which provides reliable commutation, despite possible irregularities in the network-supplied power.

BACKGROUND

In such motors, commutation (ON/OFF switching) of the current(s) flowing through the winding phase(s) is accomplished electronically. The angular position of the rotor is sensed for this purpose with the aid of sensors, for example magnetically using Hall generators. From the data ascertained by the sensors and, if applicable, from other data (rotation speed, etc.), a commutation logic unit determines the points in time at which the winding phases must be energized.

It is known in this connection, in an output stage of the motor electronics, for each of the winding phases to be preceded by a bridge circuit (half or full bridge) in which semiconductor switching elements, controlled by the commutation logic unit, ensure that (as a rule) direct current of the correct polarity flows through the winding phase in question at the times determined by the commutation logic unit. This current is furnished by a so-called DC link circuit at which a so-called DC link voltage" is available. This voltage is usually generated by way of a rectifier from a delivered AC voltage, so that a pulsating DC voltage is obtained at the DC link circuit and is smoothed there using a capacitor. The capacitance of this capacitor determines the magnitude of the DC voltage component and the magnitude of the AC component of the DC link voltage and, as a result thereof, of the winding current.

The manner in which the bridge circuit is driven by the commutation logic unit is particularly problematic in such electric motors, since the low voltage values of the logic signals generated by the commutation logic unit cannot readily be used to switch those semiconductor switching elements with which a winding is connected to, or disconnected from, the pulsating DC voltage at the link circuit.

Since the electronics necessary for activating the winding phases, including the rectifier, commutation logic unit, and output stage, are often intended to be arranged inside the housing of the electric motor (this also being referred to as a "fully integrated electronic motor"), very little installation space, for the electronics, is available, especially in the case of physically small motors. The electronics moreover account for a considerable fraction of the production cost of the electronic motor.

SUMMARY OF THE INVENTION

It is therefore an object of the invention to provide a space-conserving yet economical electric motor which is operable from an AC voltage source.

According to the invention, this object is achieved by an electric motor having a rectifier which generates, from an AC voltage source, a pulsating or rippled DC operating voltage $U_B$, a DC link connected to the output of the rectifier, a bridge circuit connected to the DC link and serving to supply current to the at least one winding phase, a switching element (e.g. a Metal Oxide Semiconductor Field Effect Transistor or MOSFET) in the bridge circuit, controllable by a voltage lower than the pulsating DC operating voltage, and an auxiliary power supply circuit which supplies a control voltage $U_{ST}$ which is lower than the pulsating DC operating voltage by a predetermined voltage difference $U_A$.

The fact that, in such a motor, a switching element, switchable with a control voltage that is less than the voltage to be switched, is used for supplying current to the at least one winding phase on the positive side, and that on the other hand the control voltage is made to follow the pulsating DC voltage to be switched by means of the auxiliary circuit, ensures that this switching element is reliably controlled, even in the context of a highly pulsating DC voltage. This allows a pulsating DC voltage with a great deal of ripple to be used as the operating voltage, thereby making possible a simply constructed (and therefore economical) circuit for generating the DC link voltage and for supplying current to the motor electronics.

This makes it possible to use a relatively small capacitor at the DC link. Its purpose is not so much to decrease the ripple of the voltage at the DC link, as to absorb the energy fed back from the motor's windings during commutation. That energy might otherwise damage the semiconductor switching elements of the bridge circuit. As a result, a motor of this kind can be operated directly from an AC power supply, e.g. in a vacuum cleaner or the like, in which context the motor can comprise a so-called fully integrated electronics system that, of course, will also comprise switching elements for commutation on the negative side.

The control voltage can moreover be generated by a single auxiliary circuit in combined fashion for several switching elements of a bridge circuit that is used. This saves space in the motor and is particularly inexpensive.

This type of circuitry is, of course, also advantageous when, for whatever reasons, a regulated DC link voltage or a DC link voltage having reduced ripple is nevertheless used.

The switching element on the positive side of the bridge circuit may be a pnp transistor, a PIGFET (P-channel Insulated Gate Field Effect Transistor, or a HEXFET (trademark of International Rectifier Corp. of El Segundo, Calif. for Field Effect Transistors). Preferably, however, the switching element is a p-channel MOSFET (Metal Oxide Semiconductor Field Effect Transistor) that is connected with its source electrode to the positive lead of the DC link, and to whose gate electrode the control voltage for controlling the p-channel MOSFET can be switched. MOSFETs of this kind have the advantage, as compared with the other switching elements mentioned, that they allow almost wattless control, that they are less expensive than other switching elements, and that they are available in smaller housings and therefore permit a more compact design.

The auxiliary circuit for generating the control voltage can be implemented, for example, using operational amplifiers or similar components with which this type of voltage following can be achieved accurately. One particularly simple embodiment employs a first capacitor, serving to generate the control voltage, connected in series with a diode, between the positive lead of the DC link and a first one of two terminals of the AC voltage source. The control voltage then occurs at that capacitor; one of its electrodes is recharged, with each negative half-wave of the AC voltage, negatively with respect to the potential present at the other electrode. The potential at the one electrode is thus always lower than that at the other electrode.

A voltage limiter such as a Zener diode, which limits the voltage at the capacitor to a predetermined value, can be connected in parallel with the capacitor. The control voltage is thereby made to follow, in particularly accurate fashion, the pulsating voltage at the DC link.

Further details and advantageous developments of the invention are evident from the exemplary embodiments, which in no way are to be understood as a limitation of the invention and are described below and shown in the drawings.

DETAILED DESCRIPTION

Figure 1:
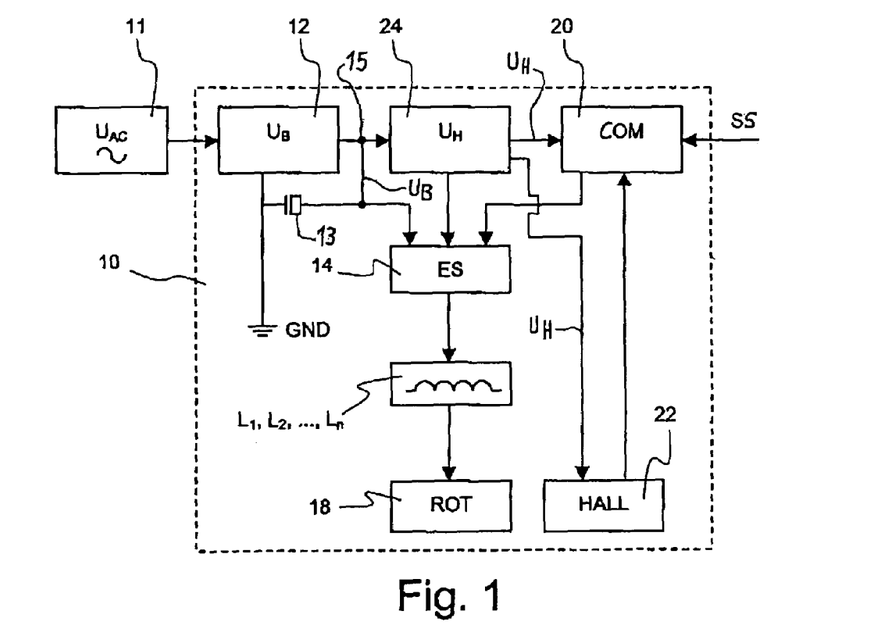
FIG. 1 is a block diagram which illustrates components of an electronically commutated motor (ECM) according to the present invention.

FIG. 1 depicts, in the form of a block diagram, parts of an electronically commutated motor (ECM) according to the present invention that is designated with the reference numeral 10. Motor 10 receives its energy from an AC voltage $U_{AC}$ that is supplied by an external AC voltage source 11. Voltage source 11 can be, for example, the single-phase 230 V power network employed in Europe, i.e. the so-called "household" power grid.

Motor 10 has an operating voltage supply 12 that, from AC voltage $U_{AC}$, generates, at a DC link circuit 15, a pulsating DC link voltage referred to hereinafter as operating voltage $U_B$. This is achieved via a rectifier 82 and a link circuit capacitor 13, both shown in FIG. 4. Capacitor 13 is usually of small dimensions for reasons of space and cost, so that operating voltage $U_B$ is a pulsating DC voltage having a relatively large alternating component.

Operating voltage supply 12 is connected to an end stage 14 that powers n winding phases L1, L2, ... of the electric motor. Commutated application of the pulsating operating voltage $U_B$ to winding phases L1, L2, ... allows, in known fashion, the generation in motor 10 of a rotating field that causes a rotor 18 to rotate. Rotor 18 is usually a permanent-magnet rotor having n magnetic poles, as schematically shown by way of example in FIG. 6. Motor 10 can be a motor having a cylindrical air gap, flat air gap, conical air gap, etc., likewise a linear motor, an air-core motor, etc., this being common knowledge in the art.

Winding phases L1, L2, ... are electronically commutated in order to generate the rotating field. Motor 10 has, for this purpose, a commutation logic unit 20 (labeled COM), to which information regarding the instantaneous rotational position of rotor 18 is conveyed from sensors 22. Sensors 22 can be Hall generators that sense the position of rotor 18 and convert it into electrical signals. Commutation logic unit 20 furthermore processes control signals SS that are generated by a higher-level open- or closed-loop control device for motor 10, for example in order to turn electric motor 10 ON or OFF, or effect a change in its rotation speed. The higher-level device can also implement so-called stall protection, which causes the winding current to be turned off if rotor 18 is prevented from rotating. Commutation logic unit 20 determines, from the signals generated by sensors 22 and from the external control signals SS, the points in time at which commutation of winding phases L1, L2, ... is to occur.

Since commutation logic unit 20 cannot operate at the (usually very high) DC link voltage $U_B$, motor 10 additionally has an auxiliary voltage supply 24, labeled $U_H$, which generates, from operating voltage $U_B$ at DC link circuit 15 or directly from the incoming line voltage $U_{AC}$, a low auxiliary voltage for logic modules (e.g. 5 V or 12 V). Auxiliary voltage supply 24 can preferably be implemented as a switching power supply of the kind known from U.S. Pat. No. 5,963,024, DOEMEN and corresponding EP 0 854 562 B, the contents of which are incorporated by reference and therefore need not be illustrated. Auxiliary voltage $U_H$ provided by auxiliary voltage supply 24 is also supplied to end stage 14 and to sensors 22.

Figure 2:
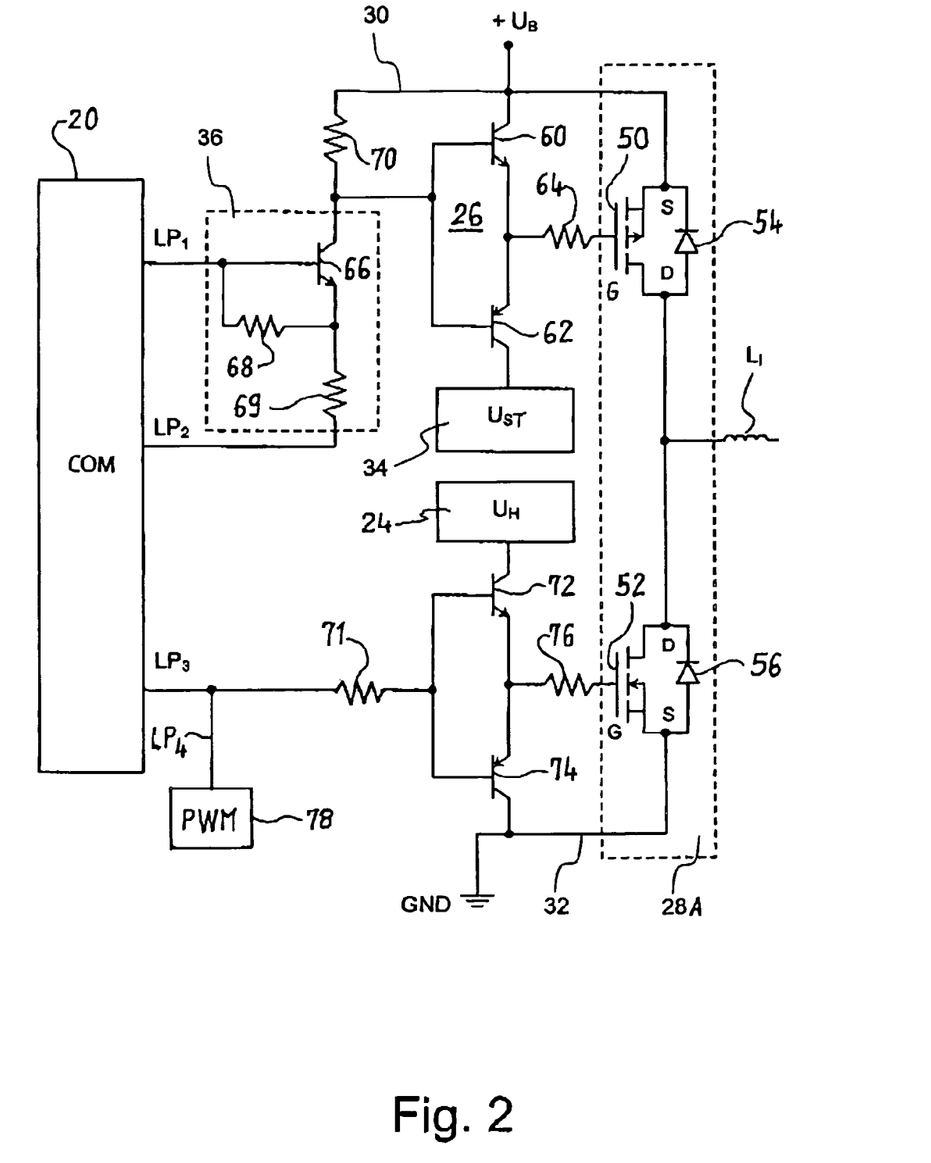
FIG. 2 is a circuit diagram for a portion of the end stage of an ECM according to the present invention.
Figure 6:
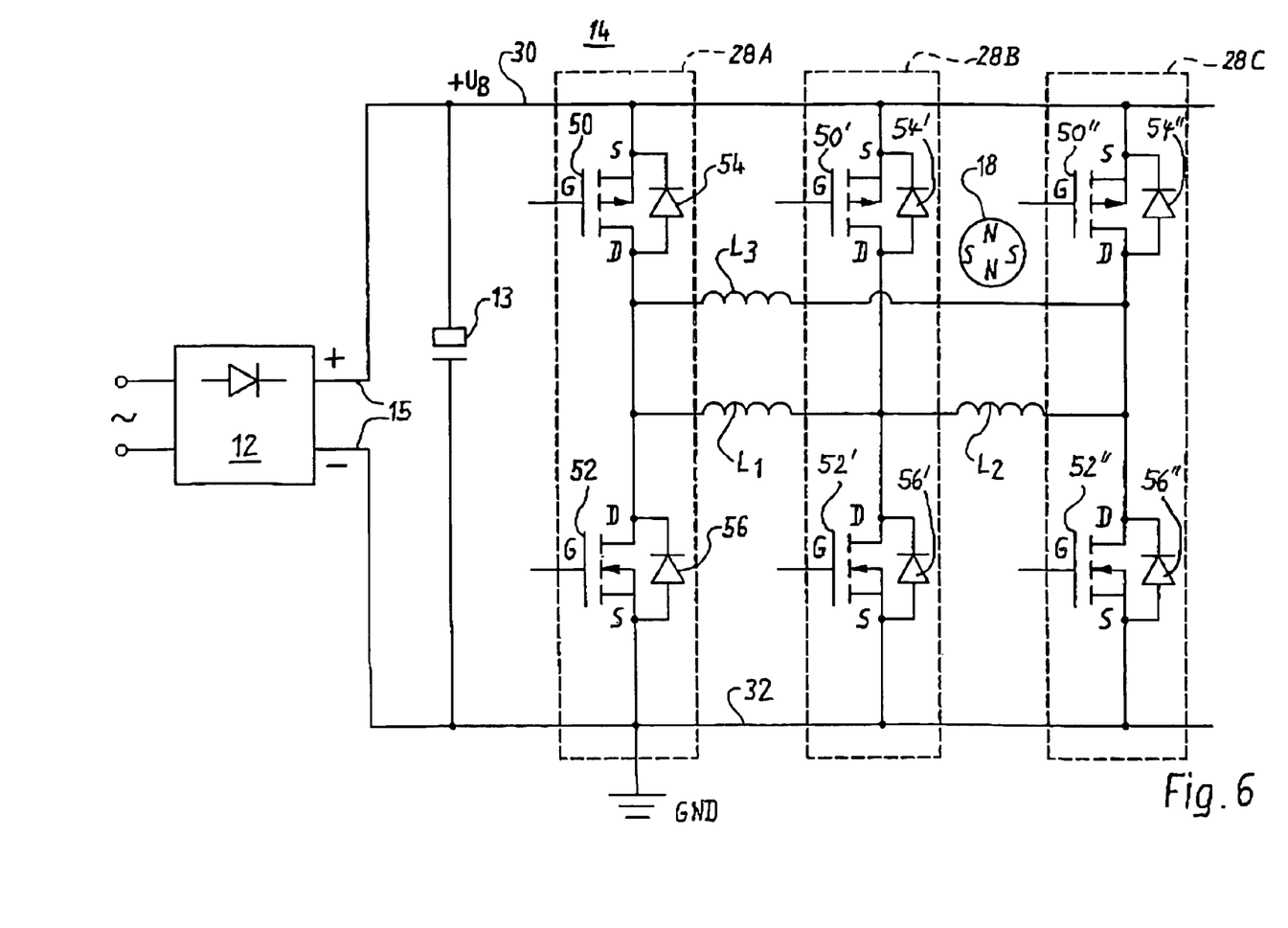
FIG. 6 is a basic circuit diagram of a bridge circuit for a three-phase ECM that is made up of three half-bridges.

FIG. 2 is a circuit diagram showing a part 28A of end stage 14 of the electric motor 10, and parts serving to control it. Part 28A is associated with a winding phase L1. It is part of bridge circuit 14, which is shown schematically in FIG. 6 and also contains two further parts 28B and 28C that are identical to bridge part 28A. Rotor 18 is shown schematically in FIG. 6 as a four-pole permanent-magnet rotor. FIG. 6 shows windings L1, L2, L3 as a delta circuit, but a star-configured circuit would likewise be possible. Other numbers of phases are also possible, e.g. an H bridge having only one winding phase. In that case, the two winding phases L2, L3 and part 28C would be omitted from FIG. 6.

The circuits shown in FIG. 2, which are associated with part 28A of end stage 14, are a constituent of the commutation logic unit; one of their purposes is to switch the high, pulsating DC voltage $U_B$ using the low-voltage logic level signals generated by commutation logic unit COM 20 (which can have, for example, the magnitude of auxiliary voltage $U_H$), in other words, to convey control information from the low-voltage side to the high-voltage side (referring to the motor's internal ground). In FIG. 2, commutation logic unit COM 20 generates several logic signals, of which only three logic signals LP1, LP2, and LP3 are shown. Logic signal LP1 controls the connection of positive lead 30 to winding phase L1, and logic signal LP3 controls the connection of internal motor ground GND (lead 32) to winding phase L1. A logic signal LP4 from a PWM generator 78 serves, when winding phase L1 is connected via MOSFET 52 to link circuit 15, to turn the MOSFET 52 on and off continuously at a predetermined pulse duty factor, e.g. 20,000 times per second, in order to control the power consumption of motor 10. In FIG. 6, all the lower bridge transistors 52 are turned on and off according to a desired pulse duty factor pwm.

The circuit shown in FIG. 2 has, in order to drive the left terminal of winding phase L1, a p-channel MOSFET 50 and an n-channel MOSFET 52 to which "recovery" or freewheeling diodes 54 and 56, respectively, are connected in antiparallel. The latter are usually integrated into the MOSFET housing. The p-channel MOSFET is connected at its source electrode S to positive lead 30 of DC link circuit 15, which receives power from rectifier 12. Negative lead 32 of the DC link circuit is the motor's internal ground GND. Each of the two MOSFETs 50, 52, in its conductive state, conveys currents between its source electrode S and its drain electrode D.

P-channel MOSFET 50 is switched via its gate G. It is blocked when the potential at its gate is approximately equal to, or greater than, the potential at its source S. It becomes conductive when the potential present at its gate is approx. 10 to 20 V less than the potential $U_B$ applied to the source. To allow reliable switching, this potential difference should not be too small. If it becomes too great, on the other hand, damage to p-channel MOSFET 50 may result. Because of these properties of p-channel MOSFET 50, it is not possible, on the one hand, to use an inexpensive rectifier 12 for the operating voltage supply or, on the other hand, to turn on p-channel MOSFET 50 by connecting its gate to a fixed potential. Because the pulsating DC voltage $U_B$ may pulsate so strongly, of FIGS. 9 and 10, the permissible potential difference between source and gate could become excessive.

P-channel MOSFET 50 is therefore turned on by applying to its gate a control voltage $U_{ST}$ that, regardless of the instantaneous value of the pulsating DC voltage $U_B$, is less than that pulsating DC voltage $U_B$ by an amount equal to a predetermined differential voltage $U_A$. This voltage therefore has (without a phase shift) the same ripple as the pulsating DC voltage $U_B$, and thus follows it closely. Control voltage $U_{ST}$ is generated in an auxiliary circuit 34 whose construction is explained in further detail in FIGS. 4 and 5. It is advantageous, in this context, that auxiliary circuit 34 needs to be present only once for the entire electric motor 10 and not, for example, n times, i.e. in a quantity corresponding to the number of winding phases L1, L2, . . . There is, of course, nothing to rule out the use of a plurality of such auxiliary circuits 34 if that is desired.

It is particularly advantageous that all the elements of the motor electronics integrated into electric motor 10 are not implemented in potential-separated fashion.

Figure 3:
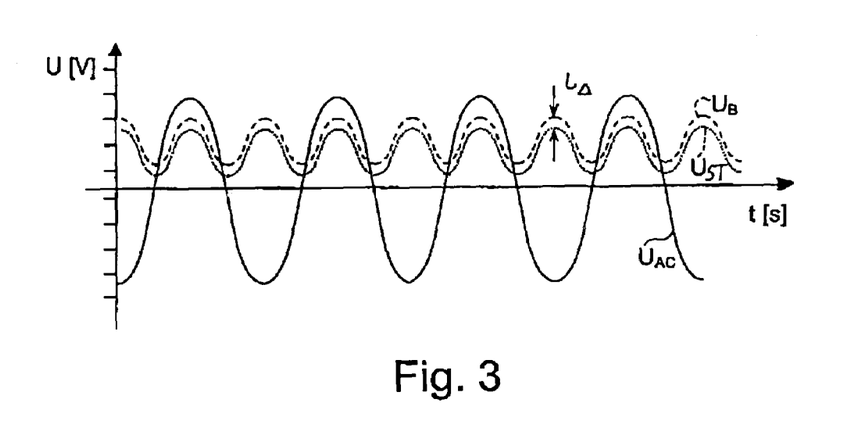
FIG. 3 shows schematic profiles, over time, of an AC voltage $U_{AC}$ used to power the ECM, of a pulsating DC voltage $U_B$ generated therefrom by a rectifier, and of a control voltage $U_{ST}$ generated by an auxiliary circuit.

FIG. 3 shows, in an idealized depiction, one possible profile over time for AC voltage $U_{AC}$ (drawn with a solid line) that can be picked off at AC voltage source 11, for the pulsating DC voltage $U_B$ (dashed line), and for control voltage $U_{ST}$ (dotted line) generated by auxiliary circuit 34. The differential voltage between operating voltage $U_B$ and control voltage $U_{ST}$ is labeled $U_A$ and can equal, for example, −18 V. Since the pulsating DC voltage $U_B$ typically has amplitudes on the order of 300 to 400 V, the differential voltage $U_A$ as shown in FIG. 3 is greatly exaggerated. FIGS. 7 through 10 show oscillograms that depict actual curves for an exemplary embodiment.

As shown in FIG. 2, in order to enable operating voltage $U_B$ and control voltage $U_{ST}$ to be applied to gate G of p-channel MOSFET 50 in an alternation controlled by commutation logic bunit 20, an npn transistor 60 and a pnp transistor 62 are provided in a circuit 26 inian emitter-follower arrangement. In this, on the one hand, the emitters of transistors 60 and 62 are at practically the same potential as gate G of p-channel MOSFET 50. In addition, the bases of the two transistors 60, 62 also are at the same potential. But because the potentials present at the collectors of the two transistors 60, 62, namely $U_B$ and $U_{ST}$, are different, the two transistors 60, 62 can be controlled together in such a way that one of them is always conductive while the other is blocked. For example, if approximately the operating voltage $U_B$ is present at the bases of transistors 60, 62, npn transistor 60 is then conductive while pnp transistor 62 is blocked, since that voltage is greater than the control voltage $U_{ST}$ present at its collector. The npn transistor 60 then applies operating voltage $U_B$ to gate G of p-channel MOSFET 50, causing the latter to become nonconductive.

If, on the other hand, a voltage slightly lower than control voltage $U_{ST}$ is present at the bases of the two transistors 60, 62, npn transistor 60 is then blocked while pnp transistor 62 now becomes conductive, since the voltage present at its base is now greater than at its collector. The pnp transistor 62 then applies control voltage $U_{ST}$ through a resistor 64 to gate G of p-channel MOSFET 50, causing the latter to become low-resistance, i.e. conductive.

The circuit shown in FIG. 2 uses a switchable constant-current source 36, which constitutes a part of commutation logic unit 20 and comprises a voltage-resistant npn transistor 66 and three resistors 68, 69, and 70, to control the potential present at the bases of transistors 60, 62. Depending on the logic signals LP1 and LP2 that are generated by commutation logic unit 20, the result will be either that transistor 66 is blocked, or that an emitter current, flowing through transistor 66, is held to a constant value determined by circuit 36.

When transistor 66 is blocked, the pulsating DC voltage $U_B$ is applied to the bases of the two transistors 60, 62; this results, as explained above, in blocking of p-channel MOSFET 50. When circuit 36 is acting as a constant-current source, however, the result of the predefined emitter current is a voltage drop, also predefined, at resistor 70 that is connected between lead 30 and the collector of transistor 66, that collector being connected to the bases of the two transistors 60 and 62. Accordingly, what is applied to the bases of transistors 60, 62 is then no longer operating voltage $U_B$, but rather a voltage reduced by an amount equal to the (constant) voltage drop at resistor 70; as a consequence, npn transistor 60 is blocked, and pnp transistor 62 is made conductive. As explained above, this causes p-channel MOSFET 50 to become low-resistance, i.e. conductive.

N-channel MOSFET 52 is controlled by a logic signal LP3, specifically via a transistor circuit. Logic signal LP3 is produced by logical combination of the signals of two Hall generators by means of a logic element (not shown). Since the source of MOSFET 52 is at the potential of internal motor ground GND, all that is necessary for driving via gate G is an auxiliary voltage $U_H$, on the order of a few volts with reference to internal motor ground, that is generated by auxiliary voltage source 24 (FIG. 1).

A circuit having an npn transistor 72 and a pnp transistor 74 serves to drive n-channel MOSFET 52. The emitters of both transistors are connected via a resistor 76 to the gate of MOSFET 52. The bases of the two transistors 72, 74 are connected to one another and, via a resistor 71, to a logic signal LP3 and to PVVM generator 78 which generates logic signal LP4. The collector of transistor 72 is connected to auxiliary voltage source 24, and the collector of transistor 74 to internal motor ground GND. Signal LP3 is created in commutation logic unit 20 from the output signals of two Hall generators 22 (FIG. 1), and is additionally logically combined with logic signal LP4 (PWM signal of generator 78). The two transistors 50 and 52 are controlled in such a way that they can never be simultaneously conductive, and so that, for example when the previously conductive transistor 50 becomes blocked and the previously blocked transistor 52 becomes conductive, a corresponding off-time is generated during the switchover operation.

Because of the low voltages, logic signals LP3 and LP4 can control the bases of the two transistors 72, 74 directly, i.e. without interposition of a constant-current source, although in some cases such a constant-current source may be necessary.

| PREFERRED COMPONENTS FOR FIG. 2 (k = kilohm) | |
|---|---|
| MOSFET 50 (p-channel) | FQD3P50 or FGD1P50 |
| MOSFET 52 (n-channel) | IRFR430B |
| Transistors 60, 62, 72, 74 | BC847BPN |
| Transistor 66 | FMMT459 |
| Resistors 64, 76 | 0 ohm |
| Resistor 68 | 27 k |
| Resistor 69 | 120 k |
| Resistor 70 | 240 k |
| Resistor 71 | 47 k |

Auxiliary circuit 34, provided in order to generate control voltage $U_{ST}$ for gate G of p-channel MOSFET 50, will be explained in more detail below with reference to FIGS. 4 and 5.

Figure 4:
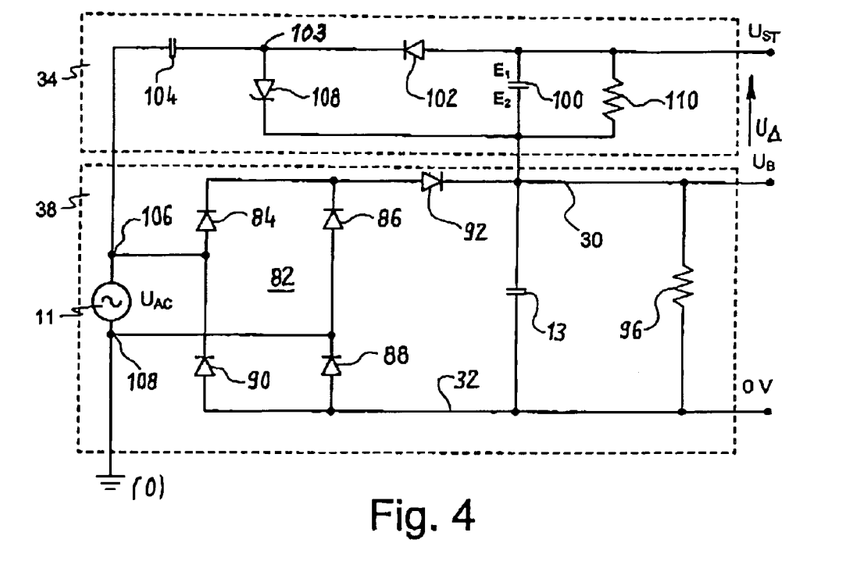
FIG. 4 is a circuit diagram of a rectifier and of a single-stage auxiliary circuit for generating a control voltage to control the p-channel switching elements of the end stage used.

FIG. 4 shows bridge rectifier 82 and a first embodiment of a suitable auxiliary circuit 34. Rectifier 82 is a full-wave rectifier that is constructed from four diodes 84, 86, 88, 90, connected to AC voltage source 11, that feed into the relatively small capacitor 13 through a diode 92. (Diode 92 is not absolutely necessary, and can be omitted in some cases.) Since a separate controller for regulating the voltage at capacitor 13 is dispensed with in this exemplary embodiment, rectifier 82 generates a highly pulsating DC voltage $U_B$, as shown in FIGS. 3 and 7 to 10. A high-resistance resistor 96 that serves to prevent critical voltage states (spikes) is connected in parallel with capacitor 13. Capacitor 13 is located between positive lead 30 and negative lead 32, the latter being connected to internal motor ground GND. Leads 30, 32 constitute the DC link circuit labeled 15 in FIG. 1.

Auxiliary circuit 34 is constructed similarly to a charge pump. Control voltage $U_{ST}$, reduced by an amount equal to differential voltage $U_A$, is produced at a capacitor 100. The lower (in FIG. 4) electrode E2 of capacitor 100 is connected to lead 30, at which the pulsating DC voltage $U_B$ is present. The other electrode E1 is connected to the anode of a diode 102 whose cathode is connected, via a node 103 and a series capacitor 104 that serves to limit current, to the one terminal 106 of AC voltage source 11 whose other terminal 108 can be connected, as shown, to the neutral conductor of the AC power network.

Located between node 103 and lead 30 is a Zener diode 108 which limits the voltage at capacitor 100 to, for example, 18 V. A resistor 110, whose function is to suppress voltage oscillations at capacitor 100, is connected in parallel therewith.

| PREFERRED VALUES OF COMPONENTS IN FIG. 4 | |
|---|---|
| AC voltage $U_{AC}$ | 230 V, 50 Hz |
| Diodes 84, 86, 88, 90, 92 | D1N4007 |
| Capacitor 13 | 4.7 µF |
| Resistor 96 | 500 kilohms |
| Capacitor 100 | 470 nF, 25 V |
| Resistor 110 | 1 megohm |
| Diode 102 | 1SS380 |
| Zener diode 108 | BZX84C18/ZTX |
| Capacitor 104 | 4.7 nF |

Operation of FIG. 4

In the circuit according to FIG. 4, only the negative half-wave of sine voltage $U_{AC}$ is used to generate a control voltage $U_{ST}$ of, for example, 18 V at capacitor 100. As a result, upper electrode E1 of capacitor 100 receives a potential that is 18 V more negative than the potential at lower electrode E2, which for its part is at the pulsating potential $U_B$. The differential voltage therefore refers to the pulsating potential $U_B$ at the link circuit. Series capacitor 104 limits the charging current in the context of this negative charging. Diode 102 prevents capacitor 100 from becoming positively charged toward a potential $+U_B$ during the positive half-wave of sine voltage $U_{AC}$. Zener diode 108 limits the voltage at capacitor 100 to the desired value of 18 V.

In the circuit, capacitor 100, whose voltage is continuously held at approximately 18 V, thus acts as a reservoir that constantly holds upper electrode E1 of capacitor 100 at a potential that is more negative, by an amount equal to a differential voltage $U_A$, than the (highly pulsating) DC voltage $U_B$.

Because source S of MOSFET 50 is continuously at $+U_B$ as shown in FIG. 2, gate G of MOSFET 50 receives, when transistor 62 is conductive and transistor 60 is blocked, a potential that is 18 V more negative than the potential at source S, so that in this case MOSFET 50 becomes continuously conductive regardless of the instantaneous magnitude of $U_B$.

Since gate G of p-channel MOSFET 50 has a low capacitance, only small currents flow in this circuit. In the case of a motor 10 having, for example, three winding phases L1, L2, L3 and a full bridge circuit 14 with three p-channel MOSFETs and three n-channel MOSFETs, the circuit shown in FIG. 2 serves to supply all three p-channel MOSFETs with the control voltage $U_{ST}$ of 18 V necessary to turn them on. A small, commercially available capacitor having a dielectric strength of, for example, 25 V can be used for capacitor 100. In a bridge circuit of this kind, therefore, each of the switching elements 28A, 28B, and 28C has, in order to drive p-channel MOSFETs 50, circuits 26, 36 that are controlled by corresponding logic signals of circuit 20, as is common knowledge in the art of electrical engineering.

Resistor 110 connected in parallel with capacitor 100 causes a defined current to flow continuously out of the circuit. Since this circuit operates with low currents, and little current is taken from it, this resistor prevents interference and voltage buildups.

In auxiliary circuit 34 shown in FIG. 4, only the negative half-wave of AC voltage $U_{AC}$ is used to generate a control voltage $U_{ST}$ to drive the p-channel MOSFETs.

Figure 5:
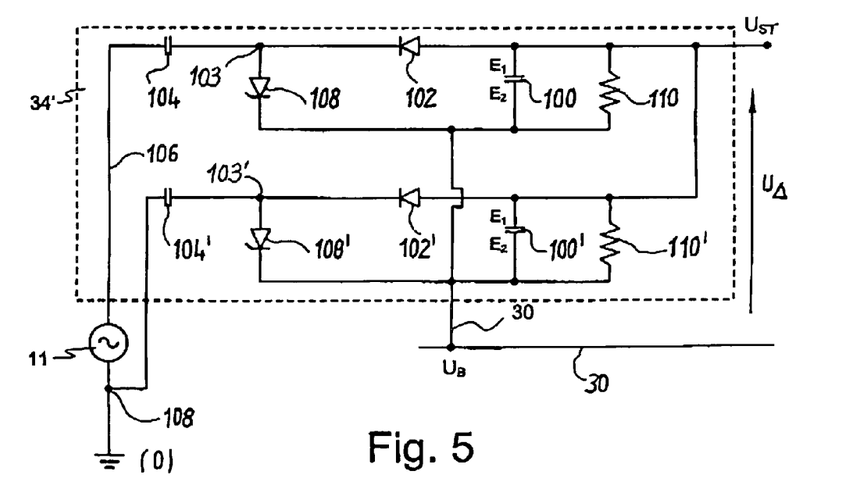
FIG. 5 is a circuit diagram of a two-stage auxiliary circuit for generating a control voltage to control the p-channel switching elements of the end stage used.

FIG. 5 shows a two-stage auxiliary circuit 34' with which both half-waves of the AC voltage can be used. Auxiliary circuit 34' comprises two of the auxiliary circuits 34 shown in FIG. 4, although they are connected to two different terminals 106, 108 of AC voltage source 11. Since capacitors 100, 100' are connected in parallel, and both half-waves of AC voltage $U_{AC}$ are used because of the two auxiliary circuits, the procedure described with reference to FIG. 4 is doubled because the frequency present is doubled. As a result, the ripple at terminal $U_{ST}$ is decreased, and more electrical charge is generated. Voltage difference $U_\Delta$ becomes more uniform here for that reason, i.e. control voltage $U_{ST}$ is even more exactly made to follow operating voltage $U_B$ in the case of circuit 34' than in the case of circuit 34 of FIG. 4.

In FIG. 5, the components of the upper part of the circuit are labeled with the same reference characters as in FIG. 4, and the components of the lower part are labeled with those same reference characters but with an apostrophe appended, e.g. 100' rather than 100. Series capacitor 104 is connected to terminal 106 of AC voltage source 11, and series capacitor 104' to terminal 108.

Figure 7:
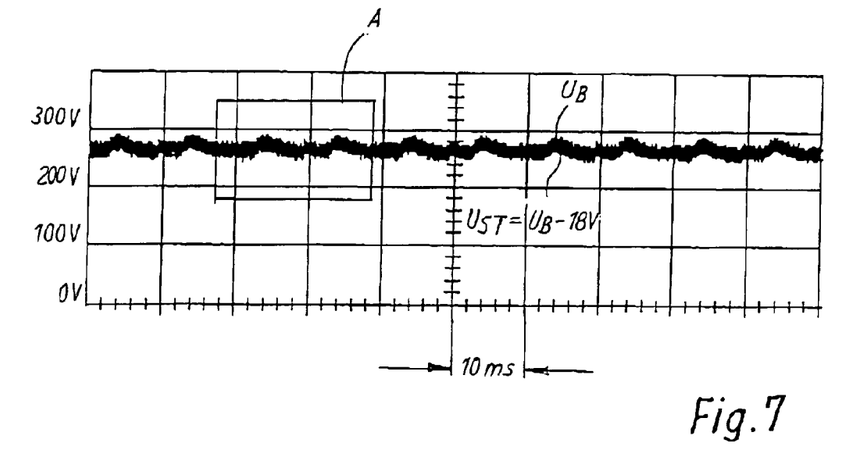
FIG. 7 is an oscillogram that shows, with the motor at idle, the operating voltage $U_B$ and the control voltage $U_{ST}$ that is about 18 V lower; a difference between the two voltages is not visible in this oscillogram.

FIG. 7 shows an oscillogram of voltage $U_B$ at link circuit 30, and of voltage $U_{ST}$ for controlling upper MOSFETs 50 of the bridge circuit. FIG. 7 shows these voltages for the situation in which the motor is idling, so that the voltages have a low ripple. Power network voltage $U_{AC}$ (for which see FIG. 3) was not shown here.

Voltage $U_B$ here has an effective value of 272.2 V and a peak-to-peak value of 34 V. Voltage $U_{ST}$ has an effective value of 254 V. Since the difference between the voltages is only 18 V, it is not visible in FIG. 7.

Figure 8:
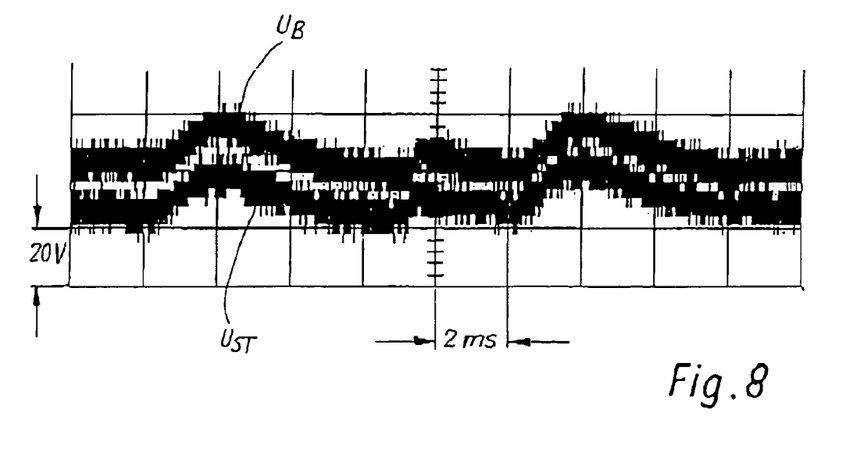
FIG. 8 is an enlargement of a portion corresponding approximately to segment A of FIG. 7; here the substantially constant voltage difference between the two voltages is clearly evident.

FIG. 8 shows an oscillogram according to FIG. 7 at greater resolution, approximately corresponding to portion A of FIG. 7. It is apparent here that a constant voltage difference, equal here to 18 V, exists between $U_B$ and $U_{ST}$. The spikes are a consequence of the commutation operations. These consequences of the commutation operations are filtered out by the interference suppression filter explained with reference to FIGS. 11 and 12, so that they cannot get into the AC voltage power grid.

Figure 9:
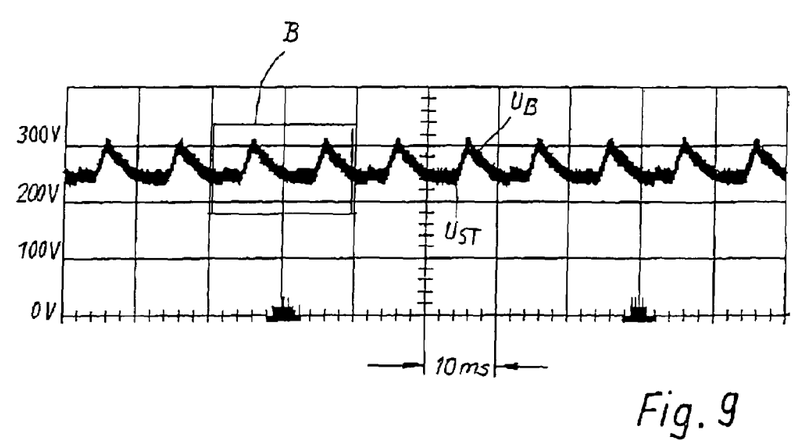
FIG. 9 is an oscillogram analogous to FIG. 7 but with the motor under load, causing the ripple in the two voltages to increase correspondingly.

FIG. 9 shows an oscillogram analogous to FIG. 7 but with the motor under load, so that the ripple in voltages $U_B$ and $U_{ST}$ is greater. Voltage $U_B$ here has an effective value of 267.1 V and a peak-to-peak value of 78 V, i.e. twice as much ripple as compared with FIG. 8.

Figure 10:
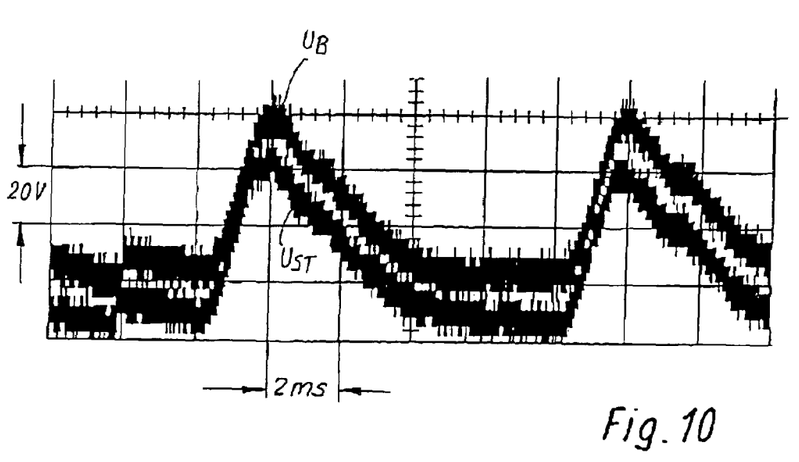
FIG. 10 is an enlargement of a portion corresponding approximately to segment B of FIG. 9 (analogous to FIG. 7)

FIG. 10 shows once again, by analogy with FIG. 8, the constant voltage difference of 18 V between $U_B$ and $U_{ST}$. FIG. 10 is an enlargement of a portion of FIG. 9.

Figure 11:
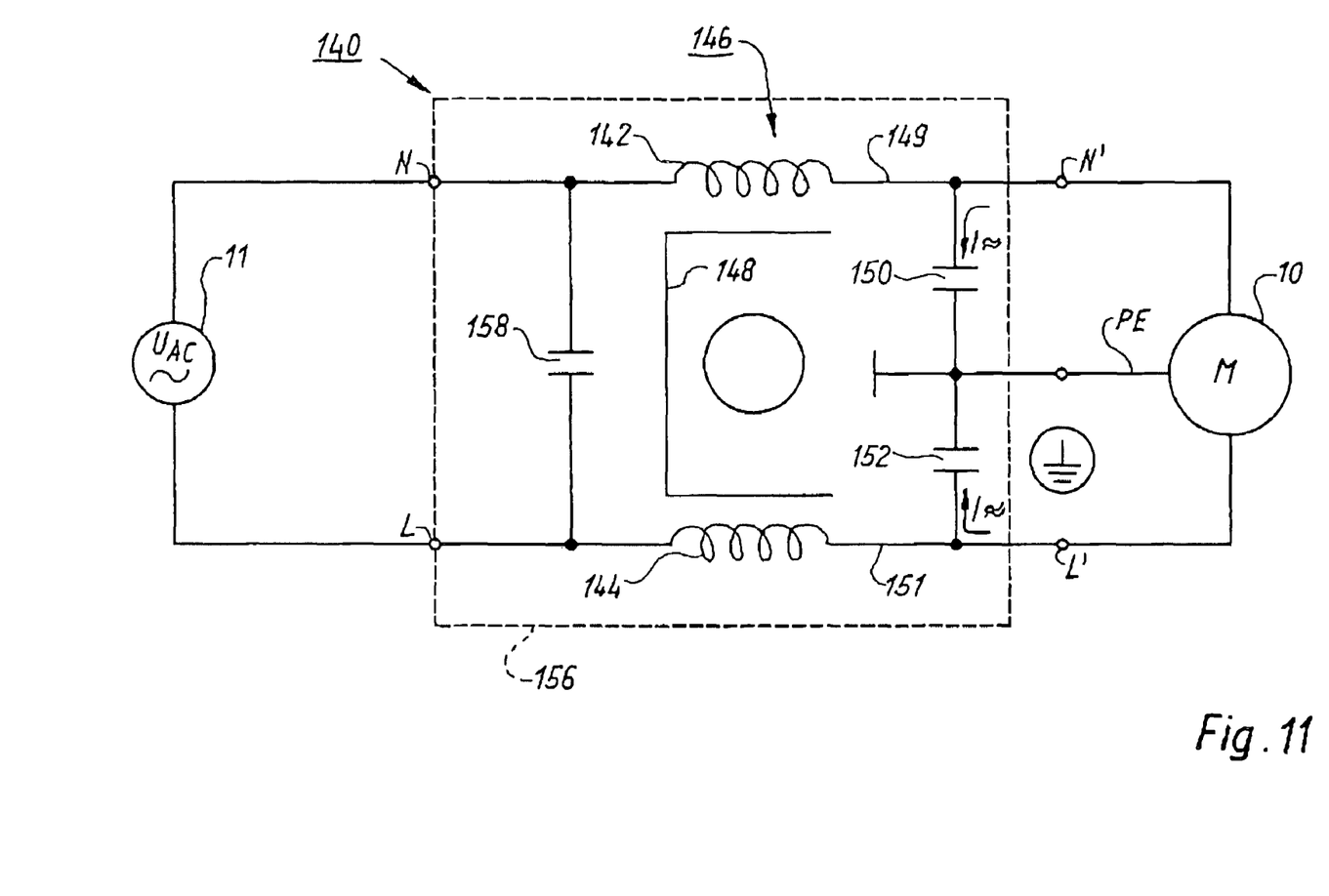
FIG. 11 shows a preferred circuit of an interference suppression filter such as the one that can be used in the supply lead from the household power network to a motor according to the present invention, e.g. as part of the main power cable.

FIG. 11 is a circuit diagram of a preferred embodiment of an interference suppression filter 140 that can be used for connecting a motor 10 according to the present invention to an AC power network 11, in order to suppress the transfer of interference from motor 10 to AC power network 11 sufficiently to comply with the limit value of European standard EN 55014 (for household power networks).

A filter of this kind can be wired, for example, into the three-conductor supply lead of motor 10. The one terminal of the AC power network is labeled N (neutral) in the usual fashion, and the other L; a ground terminal labeled PE is also provided. The terminals of motor 10 are labeled N' and L'.

Figure 12:
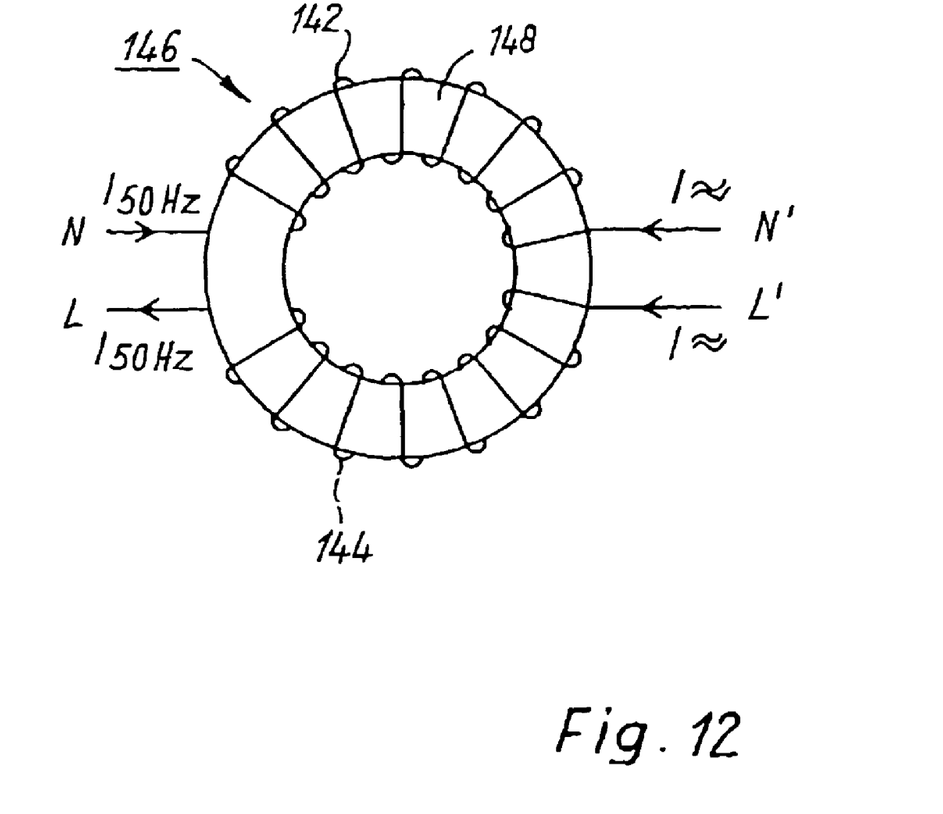
FIG. 12 is a schematic depiction of a current-compensated choke or inductor, such as the one preferably used in the interference suppression filter of FIG. 11.

An inductance 142 is present in lead N, and an inductance 144 in lead L. These inductances are, as shown in FIG. 12, constituents of a so-called current-compensated inductor 146. Such chokes or inductors are known in the art.

Motor side 149 of inductance 142 is connected to PE via a capacitor 150, and motor side 151 of inductance 144 via a capacitor 152. The entire interference suppression filter 140 is encapsulated in a metal housing 156 that is connected to ground PE. A capacitor 158 is provided on the network side of inductances 142, 144.

Operation of FIGS. 11 and 12

Motor 10 acts as a current source for high-frequency leakage currents I⁻ that flow to ground PE as leakage current Ia through capacitors 150, 152. $i_a$ typically has a magnitude on the order of less than 0.5 mA. Since particularly stringent safety requirements apply to capacitors 150, 152, so-called Y capacitors are preferably used for them.

| PREFERRED VALUES IN FIGS. 11 AND 12 | |
|---|---|
| Inductor (inductance) 142 | 1.5 mH |
| Inductor (inductance) 144 | 1.5 mH |
| Inductors 142, 144 are wound onto an annular core 148, as shown in FIG. 12. | |
| Capacitors 150, 152 | 2.2 nF (Y capacitors) |
| Capacitor 158 | 730 nF, 400 V |

Sealed metal housing 156, grounded during operation.

A filter 140 of this kind can be integrated, for example, into the power cable of motor 10, or into its three-wire standard connector, or into the motor circuit board, or into a separate circuit board, and easily enables compliance with standard EN 55014 for the household power network, e.g. in order to prevent interference, travelling via a residential electrical wiring system, from affecting television reception.

This modular construction has the advantage that the motor can be offered to the customer either with interference suppression, i.e. with a filter, or without, i.e. without a filter. This is of interest in particular if the customer has already made provisions for appropriate components of its own in the assembly. Deliver without a filter results, in this case, in a cost saving. The motor electronics themselves are not affected by these actions.

Many variants and modifications are, of course, possible within the scope of the present invention.

The invention claimed is:

1. An electronically commutated motor having terminals (106,108) for connecting to an AC voltage source (11); said motor having
   a stator having at least one winding phase (L1, L2, ... Ln);
   a permanent-magnet rotor magnetically coacting with that stator;
   a rectifier (38) which serves to generate, from an AC voltage ($U_{AC}$) at the AC voltage source (11), a pulsing DC operatingvoltage ($U_B$);

a DC link circuit (15) having a positive lead (30) and a negative lead (32), said pulsing DC voltage from said rectifier being applied between said positive and negative leads;

a bridge circuit (28) connected to said positive and negative leads of the DC link circuit (15) and serving to supply current to the at least one winding phase, said bridge circuit including an N-channel MOSFET (52) coupled to said negative lead (32) and a P-channel MOSFET (50) coupled to said positive lead (30); and an auxiliary circuit (34, 34') for generating, from the pulsing DC voltage ($U_B$) at the DC link circuit and from the AC voltage ($U_{AC}$), a control voltage ($U_{ST}$) for controlling the P-channel MOSFET (50) into a conductive state, said control voltage ($U_{ST}$) being lower than the pulsing DC voltage ($U_B$) by an amount equal to a predetermined differential voltage ($U\Delta$).

2. The motor according to claim 1, wherein the auxiliary circuit (34; 34') further comprises a first capacitor (100), serving to generate the control voltage ($U_{ST}$), said capacitor (100) being connected in series with a diode (102) between the positive lead (30) of the DC link circuit (15) and a first one (106) of said two terminals of said AC voltage source (11).

3. The motor according to claim 2, further comprising, connected in parallel with the capacitor (100), a voltage limiter (108) for limiting the voltage at the capacitor (100) to said predetermined differential voltage ($U_{[Delta]}$).

4. The motor according to claim 3, wherein the voltage limiter is a Zener diode (108).

5. The motor according to claim 2, further comprising a resistor (110), connected in parallel with the capacitor (100), which serves to minimize charge oscillations at the capacitor (100) and to minimize any voltage spikes and interference due to electromagnetic radiation.

6. The motor according to claim 2, further comprising a further capacitor (104), connected in series with the capacitor (100) and the AC voltage source (11).

7. The motor according to claim 2, wherein the auxiliary circuit (34') further comprises:

a second capacitor (100') for generating the control voltage, said capacitor being connected between the positive lead (30) of the DC link circuit (15) and a second one (108) of said two terminals of the AC voltage source (11); and a second diode (102') connected between the second capacitor (100') and said second one (108) of the two terminals of the AC voltage source (11).

8. The motor according to claim 1, further comprising a commutation logic unit (20); and a plurality of control elements (60, 62) that are driven by said commutation logic unit (20) and which in turn drive the MOSFETs (50, 52).

9. The motor according to claim 8, further comprising a constant-current source (36) controllable by the commutation logic unit (20), wherein control elements are implemented as bipolar transistors (60,62) and the bases of those bipolar transistors are connected via a resistor (7) to the positive lead (30) of the DC link circuit, the current through the resistor (70) being determined by said constant-current source (36).

10. The motor according to claim 9, wherein the constant-current source (36) comprises a high-voltage-resistant transistor (66), connected as a constant-current source, the collector of which is connected to the resistor (70) and the base of which is connected to an output of the commutation logic unit (20).

11. The motor according to claim 1, wherein bipolar transistors (60, 62) controlled by a commutation logic unit (20) of the electric motor (10), are provided in order to control the p-channel MOSFETs (50).

12. The motor according to claim 11, wherein the bases of the bipolar transistors (60, 62) are connected via a resistor (70) to the positive lead (30) of the DC link circuit, the current through the resistor (70) being determined by a constant-current source (36) controllable by the commutation logic unit (20).

13. The motor according to claim 12, wherein the constant-current source (36) comprises a high-voltage-resistant transistor (66), connected as a constant-current source, whose collector is connected to the resistor (70) and whose base is connected to the commutation logic unit (20).

* * * * *